UNITED STATES PATENT OFFICE.

ISAAC WELLS, OF WILMINGTON, NORTH CAROLINA, ASSIGNOR TO J. F. POST, OF SAME PLACE, AND D. D. BARBER, OF SUMTER COUNTY, SOUTH CAROLINA, ONE-FOURTH TO EACH.

IMPROVEMENT IN PROCESSES OF TANNING.

Specification forming part of Letters Patent No. 223,200, dated December 30, 1879; application filed June 19, 1879.

*To all whom it may concern:*

Be it known that I, ISAAC WELLS, of Wilmington, in the county of New Hanover and State of North Carolina, have invented certain new and useful Improvements in Processes for Tanning; and I do hereby declare the following to be a full, clear, and exact description of the invention, such as will enable others skilled in the art to which it pertains to make and use it.

My invention relates to certain improvements in the process of tanning; and it consists of two main parts, as follows:

The first part of the invention has for its object the process of deadening hides simultaneously with liming them, the same consisting in subjecting soaked hides, first, to the action of lime alone; secondly, to the action of lime combined with a small quantity of sugar or molasses; and, finally, to the action of lime combined with a larger quantity of sugar or molasses.

The second part of the invention has for its object the process of reducing the hard condition of stock caused by lime, thereby simultaneously softening and plumping the stock, said process consisting in subjecting stock having all lime removed therefrom for several hours to a strong bath composed solely of salt and water, immediately prior to placing the stock in the tan-vat.

The manner of carrying out my invention, more in detail, with raw hides, is as follows: Take fifty sides of raw hides weighing six hundred pounds. After they are soaked, place them in lime, and the second day add a small quantity of molasses or sugar. The fourth day add a greater quantity of molasses or sugar. The hides are thus deadened and the process of tanning them is forwarded about two days, inasmuch as they are prevented from losing in weight or wasting. The sweat or hot house, though accomplishing much the same purpose, injures the strength and vitality of the raw hides, instead of preserving them. The treatment of the hides commences in the lime, and when they are well limed and unhaired they are subjected to the action of a drench-wheel, which removes all lime. They are then unfleshed, and finally worked off on a beam, when they are ready for the strong salt bath. Seventy-five pounds, more or less, of common salt is dissolved in a vat of four hundred gallons of water, into which solution the raw hides are placed for three hours or more, and the hard condition of the stock caused by the lime is thereby reduced. The salt bath also softens them and plumps them, after which they are placed in the tan-vat. The hides in the tan-vat should first receive one-half strength of a solution of the *Anthemis cotula* and its extract for three days. The fourth day the bath should be strengthened with bark and its extract; the fifth day with the extract of the *Anthemis cotula*; the sixth day with the extract of bark. On the ninth day the solution will be at full strength, and in twenty days the stock will be well tanned.

This extract of bark serves to counteract any tendency the salt bath may have to unduly soften the stock, especially certain kinds of stock which require a good degree of firmness; and with this end in view I make the said extract as follows: One thousand pounds of ground bark is put in a steam-tub and covered one-half to the top with water or two-thirds-spent solution. It is then steamed with a steady heat and boiled for one hour and a half. The extract is drawn off, and the bark is covered one-fourth to the top with water or a two-third-spent solution. It is boiled hard for two hours, and the resulting extract is drawn off hot. The bark is then finally covered one-eighth to the top with water or a two-third-spent solution and boiled hard for two hours and half. The extract therefrom is drawn off hot and the bark is thrown away. Extract can be made in this way daily, and used by any tannery without acid, which injures the tan.

In tanning sole-leather, thirty sides thereof, weighing six hundred pounds, are treated in the manner previously described for raw hides, only the above solution of *Anthemis cotula* and bark should not reach its full strength until the sixteenth day, and the stock should be well tanned within thirty-five days. Harness-leather and skirting are correspondingly treated.

To tan six hundred pounds of leather my process requires about three times that weight of tanning material, which may be in any desirable proportion of bark or *Anthemis cotula*, with its various branches.

Having fully described my invention, what I claim as new, and desire to secure by Letters Patent, is—

1. The herein-described process of tanning, consisting of the following steps: first, subjecting soaked hides to lime, then to lime combined with sugar or molasses, and finally to lime combined with a larger quantity of sugar or molasses; second, removing all lime from the unhaired stock, and unfleshing the latter; third, treating said stock with a strong salt solution; fourth, subjecting it immediately to the action of the herein-described solution of *Anthemis cotula* and bark, substantially as set forth.

2. The process of deadening hides simultaneously with liming them, the same consisting in subjecting soaked hides first to the action of lime alone, secondly to the action of lime combined with a small quantity of sugar or molasses, and finally to the action of lime combined with a larger quantity of sugar or molasses, substantially as set forth.

3. The process of reducing the hard condition of stock caused by lime, and thereby simultaneously softening and plumping the stock, said process consisting in subjecting stock having all lime removed therefrom for several hours to a strong bath composed solely of salt and water, immediately prior to placing the stock in the tan-vat, substantially as set forth.

In testimony that I claim the foregoing I have hereunto set my hand this 12th day of June, 1879.

ISAAC WELLS.

Witnesses:
  VINTON COOMBS,
  GEO. D. SEYMOUR.